(12) United States Patent
Tanaka

(10) Patent No.: US 12,724,214 B2
(45) Date of Patent: Sep. 1, 2026

(54) OPTICAL TRANSCEIVER WITH TWO ROWS OF CONTACT PADS ON BOTH SURFACES OF THE ELECTRICAL CONNECTOR

(71) Applicant: SUMITOMO ELECTRIC DEVICE INNOVATIONS, INC., Yokohama (JP)

(72) Inventor: Hiromi Tanaka, Yokohama (JP)

(73) Assignee: SUMITOMO ELECTRIC DEVICE INNOVATIONS, INC., Yokohama (JP)

( * ) Notice: Subject to any disclaimer, the term of this patent is extended or adjusted under 35 U.S.C. 154(b) by 501 days.

(21) Appl. No.: 18/317,960

(22) Filed: May 16, 2023

(65) Prior Publication Data

US 2023/0375794 A1 Nov. 23, 2023

(30) Foreign Application Priority Data

May 19, 2022 (JP) ................................ 2022-082222

(51) Int. Cl.
*G02B 6/42* (2006.01)
*H01R 13/70* (2006.01)

(52) U.S. Cl.
CPC ........... *G02B 6/4278* (2013.01); *H01R 13/70* (2013.01)

(58) Field of Classification Search
CPC .... H04B 10/40; G02B 6/4274; G02B 6/4278; G02B 6/4284
See application file for complete search history.

(56) References Cited

U.S. PATENT DOCUMENTS 10,271,403 B2 * 4/2019 Zheng .................... G02B 6/428

FOREIGN PATENT DOCUMENTS

JP 2003-218972 A 7/2003

* cited by examiner

*Primary Examiner* — Abdullah A Riyami
(74) *Attorney, Agent, or Firm* — McDonald Hopkins LLC

(57) ABSTRACT

An optical transceiver includes an electrical connector, an internal circuit, first switch and second switch. The internal circuit is electrically connected to the apparatus through the electrical connector when the optical transceiver is completely inserted into the apparatus, and generate a switching signal after a first signal pad and a second signal pad in a second row of the electrical connector are electrically connected. The first switch isolates a third signal pad in a first row of the electrical connector when the optical transceiver is not fully inserted, and puts the third signal pad electrically connectable in accordance with the switching signal when the optical transceiver is fully inserted. The second switch isolates a fourth signal pad in the first row when the optical transceiver is not fully inserted, and puts the fourth signal pad electrically connectable in accordance with the switching signal when the optical transceiver is fully inserted.

6 Claims, 14 Drawing Sheets

67
67b
67a
69b
69a
71b
71a
AIN

Fig.9

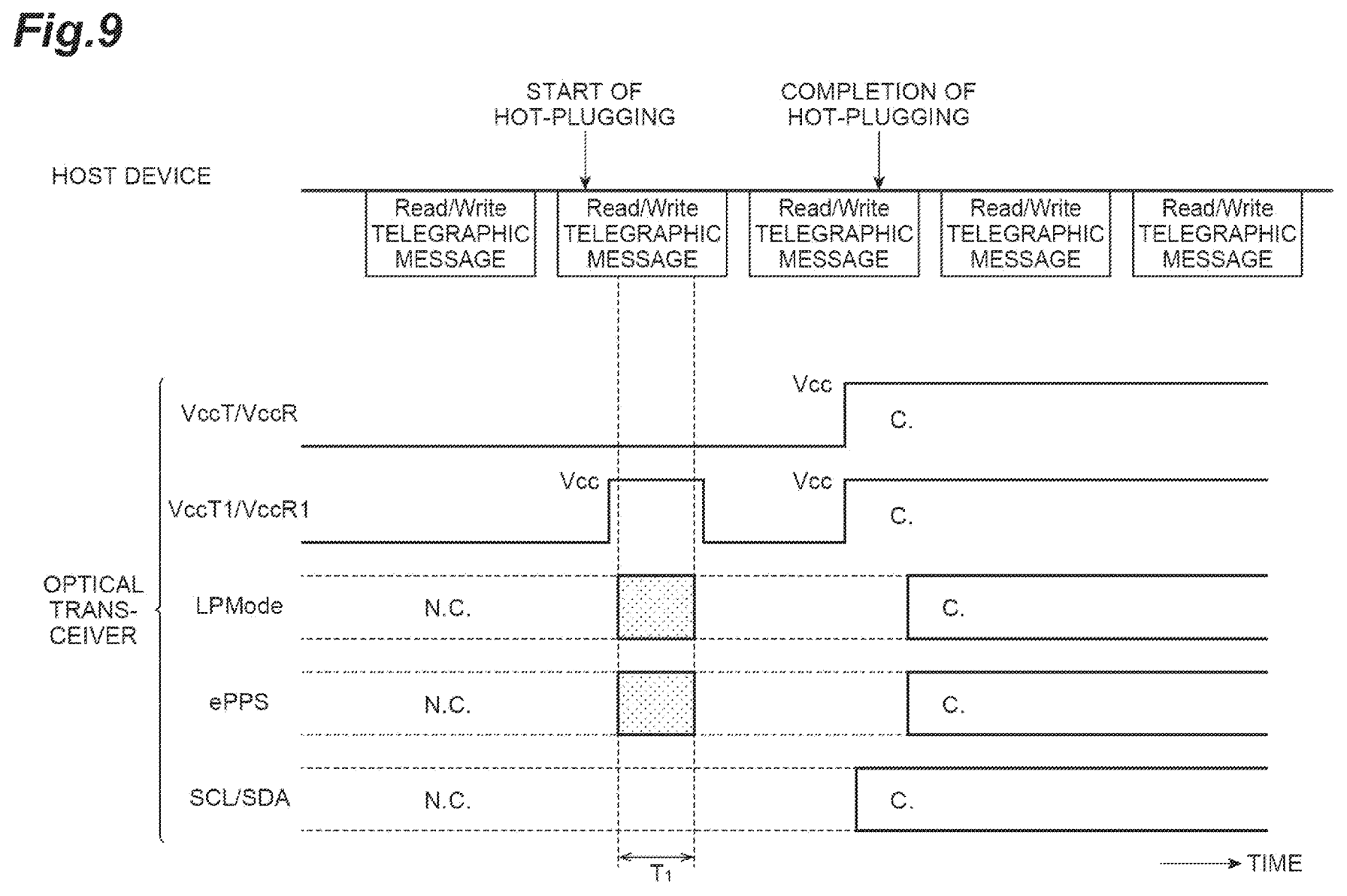

HOST DEVICE

START OF HOT-PLUGGING

COMPLETION OF HOT-PLUGGING

Read/Write TELEGRAPHIC MESSAGE

Read/Write TELEGRAPHIC MESSAGE

Read/Write TELEGRAPHIC MESSAGE

Read/Write TELEGRAPHIC MESSAGE

Read/Write TELEGRAPHIC MESSAGE

Read/Write TELEGRAPHIC MESSAGE

OPTICAL TRANS-CEIVER

VccT/VccR

VccT1/VccR1

LPMode ePPS

SCL/SDA

Vcc

Vcc

Vcc

C.

C.

C.

C.

C.

N.C.

N.C.

N.C.

$T_1$

TIME

OPTICAL TRANSCEIVER WITH TWO ROWS OF CONTACT PADS ON BOTH SURFACES OF THE ELECTRICAL CONNECTOR

CROSS-REFERENCE TO RELATED APPLICATION

This application claims priority from Japanese Patent Application No. 2022-082222, filed on May 19, 2022, the entire subject matter of which is incorporated herein by reference.

TECHNICAL FIELD

The present disclosure relates to an optical transceiver.

BACKGROUND

Japanese Unexamined Patent Publication No. 2003-218972 discloses a transmission device including a single central processing unit and a plurality of optical data links. In this transmission device, when a data signal is transmitted by serial communication from the single central processing unit to the plurality of optical data links, a selector selects one optical data link and outputs a clock signal to only the selected optical data link.

SUMMARY

According to an aspect of the present disclosure, there is provided an optical transceiver configured to be inserted into an apparatus in a first direction. The optical transceiver includes an electrical connector which has a first row and a second row. The first row and the second row are arranged in the first direction so that the first row is first inserted into the apparatus and the second row is later inserted into the apparatus when the optical transceiver is inserted into the apparatus. The second row includes a first signal pad and a second signal pad. The first signal pad and the second signal pad are arranged in a second direction crossing the first direction. The first row includes a third signal pad and a fourth signal pad. The third signal pad and the fourth signal pad are arranged in the second direction. The first signal pad and the third signal pad are arranged in the first direction, and the second signal pad and the fourth signal pad are arranged in the first direction. The optical transceiver further includes an internal circuit configured to be electrically connected to the apparatus through the electrical connector when the optical transceiver is completely inserted into the apparatus, and generate a switching signal after the first signal pad and the second signal pad are electrically connected to the apparatus, and a first switch configured to isolate the third signal pad from the internal circuit when the optical transceiver is not fully inserted in the apparatus, and put the third signal pad electrically connectable in accordance with the switching signal when the optical transceiver is fully inserted in the apparatus, and a second switch configured to isolate the fourth signal pad from the internal circuit when the optical transceiver is not fully inserted in the apparatus, and put the fourth signal pad electrically connectable in accordance with the switching signal when the optical transceiver is fully inserted in the apparatus.

BRIEF DESCRIPTION OF THE DRAWINGS

FIG. 9 is a timing chart showing a timing of generating a serial communication telegraphic message transmitted and received by the host device, and a timing of change in a connected state in an internal circuit of the optical transceiver according to the present embodiment.

DETAILED DESCRIPTION

Hereinafter, an embodiment of the present disclosure will be described with reference to the drawings. In description of the drawings, the same reference signs are applied to the same elements, and duplicate description will be omitted.

(Overview Constitution of Internal Circuit of Optical Transceiver)

Figure 1:
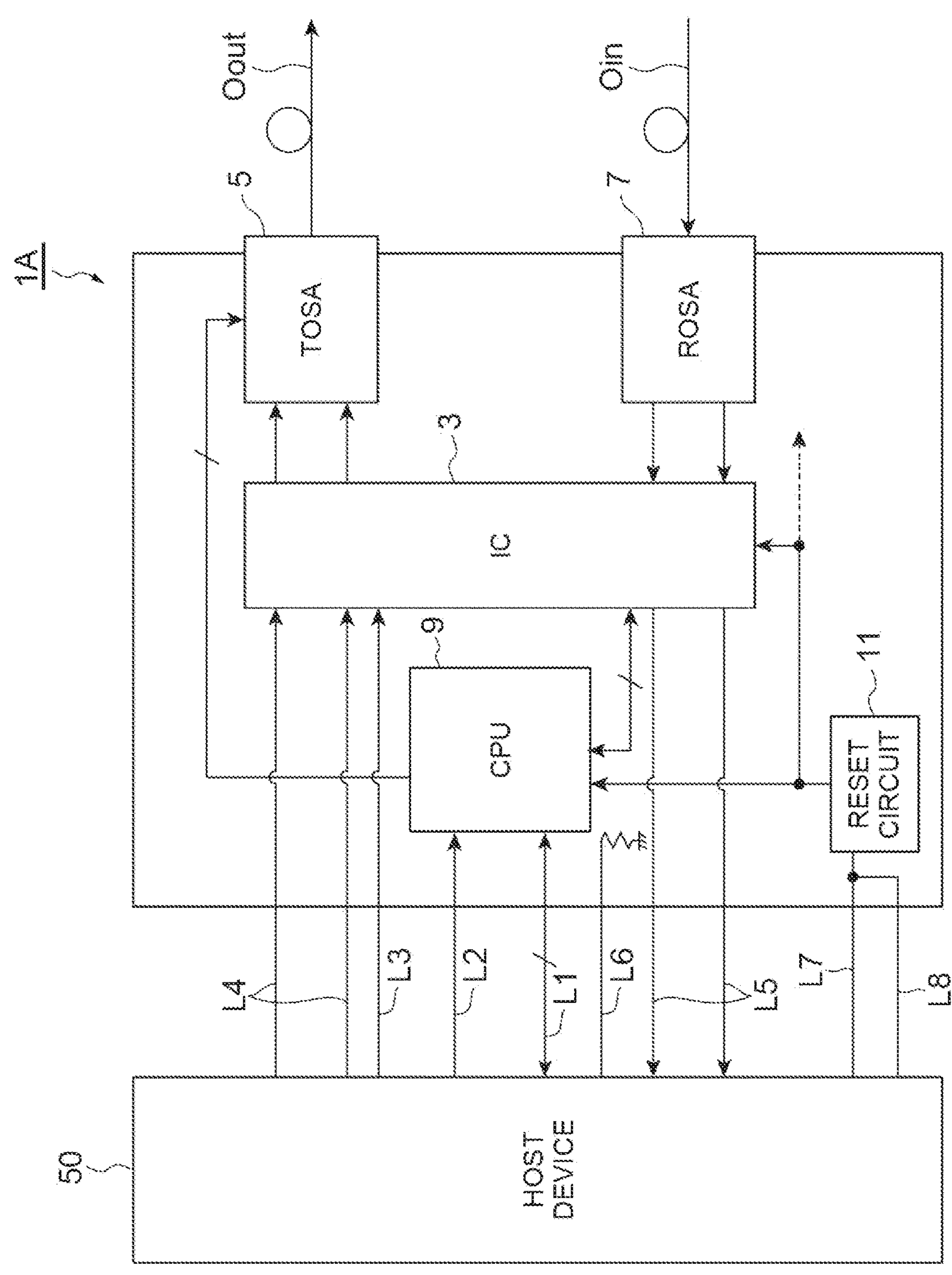
FIG. 1 is a block diagram illustrating a constitution of an optical transceiver according to an embodiment of the present disclosure.

FIG. 1 is a block diagram illustrating a schematic constitution of an optical transceiver 1A according to the embodiment of the present disclosure. For example, this optical transceiver 1A is a device used for transmitting and receiving an optical signal in an optical communication system or the like. For example, the optical transceiver 1A has an optical multiplexing function, an optical demultiplexing function, a photoelectric interconversion function, an electrical waveform shaping function, and the like. For example, the optical transceiver 1A can perform high-speed optical communication (112 Gbps) in conformity with small form-factor pluggable double density multi-source agreement (SFP-DD MSA). As illustrated in the same diagram, the optical transceiver 1A is mounted in an external host device (transmission apparatus) 50 and is electrically connected to the host device 50 through a signal line, a power supply line, or the like. The optical transceiver 1A can perform bidirectional communication with an optical transceiver mounted in another host device through an optical fiber cable, a relay device, or the like.

For example, the optical transceiver 1A includes an integrated circuit (IC) 3, a transmitter optical sub-assembly (TOSA) 5 (optical transmitter device), a receiver optical sub-assembly (ROSA) 7 (optical receiver device), a CPU (switching signal circuit, computation device) 9, and a reset circuit (switching signal circuit) 11. For example, the optical transceiver 1A is hot-plugged and inserted into a cage included in the host device 50 and is mounted in the host device 50.

For example, a light emitting element, an optical multiplexer, and the like are built into the TOSA 5. For example, the light emitting element is a laser diode. For example, the TOSA 5 includes two laser diodes and generates two-channel optical signals. Here, a channel denotes a transmission path for transferring an electrical signal or an optical signal, and a plurality of channels denote a plurality of transmission paths installed in parallel with each other and individually transmitting an independent signal. This TOSA 5 generates two-channel optical signals having peak wavelengths different from each other based on two-channel electrical signals (electrical input signals) TX from the external host device 50, multiplexes the optical signals, and outputs the multiplexed signal as one optical output signal Oout. The optical output signal Oout is a signal multiplexed for wavelength division multiplexing (WDM) using two optical signals having peak wavelengths different from each other.

For example, a light receiving element, an optical demultiplexer, and the like are built into the ROSA 7. For example, the light receiving element is a photodiode. For example, the ROSA 7 receives two-channel optical signals. More specifically, this ROSA 7 receives an optical input signal Oin from the outside and demultiplexes the optical input signal Oin into two-channel optical signals having peak wavelengths different from each other. For example, the optical input signal Oin is a signal multiplexed for wavelength division multiplexing (WDM) using two optical signals having peak wavelengths different from each other. Moreover, the ROSA 7 receives each of the two-channel optical signals with each of two photodiodes and converts the optical signals into a photocurrent (electrical signal).

For example, clock data recovery (CDR) units, laser diode driver (LDD) units, transimpedance amplifier (TIA) units, and the like for two channels are built into the integrated circuit 3. For example, the LDD units of the integrated circuit 3 are drive circuits respectively modulating two laser diodes inside the TOSA 5 based on the two-channel electrical signals TX and outputting optical signals. The LDD units may generate optical signals modulated from continuous light in accordance with the electrical signals TX by driving optical modulators in place of the laser diodes. The LDD units are an example of optical transmitting units converting an electrical signal into an optical signal for transmission. For example, the TIA units of the integrated circuit 3 are amplifier circuits respectively converting two photocurrents output from two-channel photodiodes inside the ROSA 7 into an electrical signal (electrical output signal) RX. The TIA units are an example of optical receiving units converting a received optical signal into an electrical signal. For example, the CDR units of the integrated circuit 3 are signal processing circuits for respectively waveform-shaping of two electrical signals TX from the outside and two electrical signals RX from the TIA units. For example, the electrical signals TX and RX output again from the CDR units are 4-level pulse amplitude modulation (PAM4) signals (modulation speed of 28 Gbaud (corresponding to 56 Gbps)×two channels). For example, the CDR units may perform signal processing for generating one PAM4 signal from two NRZ signals and encoding for forward error correction. The CDR units are an example of signal processing units performing signal processing of electrical signals for transmitting and receiving. The LDD units may be built into the TOSA 5, and the TIA units may be built into the ROSA 7. The circuits described above are in a set of functions and constitutions. A plurality of circuits may be integrated on one semiconductor chip, or circuits may be respectively formed on single semiconductor chips. When each of the circuits is constituted as a single IC or a single LSI, the IC and the LSI may be mounted on a printed circuit board and constitute a control circuit.

The CPU 9 is a computation device constituted of a logic circuit such as a one-chip microcontroller, a field programmable gate array (FPGA), or a complex programmable logic device (CPLD), or a combination of these. The CPU 9 executes monitoring and controlling of operation of the optical transmitting unit and the optical receiving unit by executing a micro-program (for example, firmware) stored therein. Inside a built-in storage device, the CPU 9 may further store setting data and the like, required for communication for the monitoring and the controlling with the host device 50, and required for monitoring and controlling of operation of the optical transmitting unit and the optical receiving unit.

For example, the optical transceiver 1A having the foregoing constitution is provided with a plurality of signal lines for transmitting and receiving various signals including the electrical signals TX and RX with the host device 50. Specifically, a communication line L1 for serial communication of an inter-integrated circuit (I2C) or the like with the external host device 50 is connected to the CPU 9. Accordingly, the host device 50 can monitor the inside of the optical transceiver 1A or can control operation of the optical transceiver 1A. For example, frame constitutions, commands, and the like for monitoring and controlling are set in advance, and the host device 50 monitors and controls the optical transceiver 1A by transmitting a command to the CPU 9. In addition, a signal line L2 for receiving a control signal LPMode for switching an operational state of the optical transceiver 1A between a low power mode and a high power mode from the host device 50 is connected to the optical transceiver 1A. For example, the high power mode (also referred to as a normal mode) is an operational state in which the optical transceiver 1A transmits and receives an optical signal as a normal operation for information transmission. For example, the low power mode (also referred to as a standby mode) is a standby state in which power consumption of the optical transmitting unit and the optical receiving unit is reduced by halting transmitting and receiving of an optical signal. For example, the signal line L2 is connected to the CPU 9 inside the optical transceiver 1A. Moreover, a signal line for notification of an alarm signal informing the host device 50 of detection of a deviation from the normal operational state or an abnormality, and other signal lines (not illustrated) such as a signal line for receiving a reset signal for resetting the CPU 9 from the host device 50 are also connected to the optical transceiver 1A. The signal lines may also be connected to the CPU 9 in the optical transceiver 1A. Furthermore, a plurality of signal lines L4 for receiving the electrical signals TX for two channels from the host device 50, and a plurality of signal lines L5 for transmitting the electrical signals RX for two channels toward the host device 50 are connected to the integrated circuit 3. For example, the electrical signals TX and the electrical signals RX may have a signal speed of 50

Gbps or higher, and one electrical signal is transmitted as a differential signal. In addition, a signal line L3 for receiving a clock signal ePPS having a predetermined frequency (for example, several tens of MHz) from the host device 50 is also connected to the integrated circuit 3. This clock signal ePPS is used for setting a clock frequency inside the integrated circuit 3 to a predetermined frequency. Moreover, a signal line L6 for transferring a detection signal Mod_ABS for detecting a mounted state of the optical transceiver 1A from the host device 50 is connected to the inside of the optical transceiver 1A.

In addition, the optical transceiver 1A is also provided with power supply lines L7 and L8 for receiving supply of power from the host device 50. For example, the power supply line L7 is a wiring for supplying power supply voltages VccT and VccT1 for optical transmitting from the host device 50. For example, the power supply line L8 is a wiring for supplying power supply voltages VccR and VccR1 for optical receiving from the host device 50. The power supply lines L7 and L8 may be constituted of a plurality of wirings for supplying a power supply voltage and a power supply current required for operation of the optical transceiver 1A from the host device 50. The power supply voltages VccT and VccT1 for optical transmitting supplied via the power supply line L7 and the power supply voltages VccR and VccR1 for optical receiving supplied via the power supply line L8 are received and integrated by the reset circuit 11 inside the optical transceiver 1A, for example. The integrated power supply voltage is supplied to the CPU 9, the integrated circuit 3, and other circuits inside the optical transceiver 1A. A power supply current required for operation of each of the circuits inside the optical transceiver 1A can be supplied by integrating the power supply voltages divided for a plurality of systems in this manner. The reset circuit 11 may have a function of detecting a rise (supply start) of the power supply voltages VccT and VccT1 for optical transmitting or the power supply voltages VccR and VccR1 for optical receiving and activating (or rebooting) the CPU 9 upon this detection.

Figure 2:
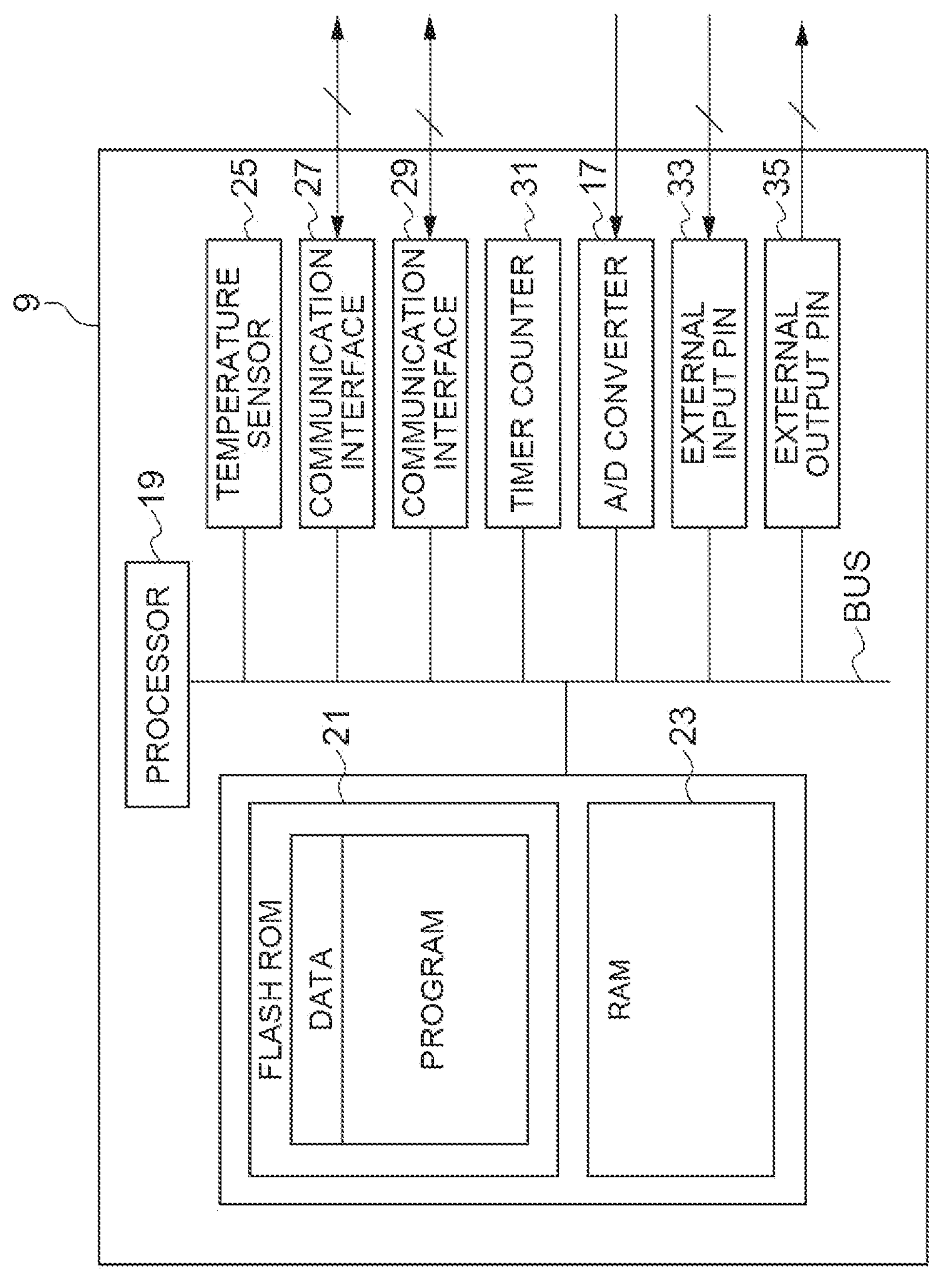
FIG. 2 is a block diagram illustrating an example of a constitution of a CPU in FIG. 1.

FIG. 2 illustrates an example of a constitution of the CPU 9. The CPU 9 includes a processor (computation circuit) 19, a non-volatile memory (flash ROM) 21, a volatile memory (RAM) 23, a temperature sensor 25, a communication interface 27 for external communication, a communication interface 29 for internal communication, a timer counter 31, an A/D converter 17, an external input pin 33, an external output pin 35, and an internal bus BUS connecting these such that communication can be performed inside the CPU 9. The flash ROM 21 built into the CPU 9 stores data and programs which the processor 19 refers to or executes. For example, the communication interface 27 is a communication interface for serial communication with the host device 50. The communication interface 29 is a communication interface for serial communication with an internal circuit such as the integrated circuit 3. The external input pin has not only terminals (pins) connected to a wiring for inputting a signal but also an input circuit converting a level of a signal input from the outside to a level of a signal inside the CPU 9, and a function of controlling accessibility to an internal bus, and the like. The external output pin has not only terminals (pins) connected to a wiring for outputting a signal but also an output circuit converting a level of a signal inside the CPU 9 to a level of a signal output to the outside, and a function of controlling availability of outputting a signal, and the like.

(Connection Constitution of Transmission Device Including Optical Transceiver)

Next, with reference to FIG. 3 and FIG. 4, an example of a constitution of a transmission device including a plurality of optical transceivers 1A having the constitution described above will be described.

Figure 3:
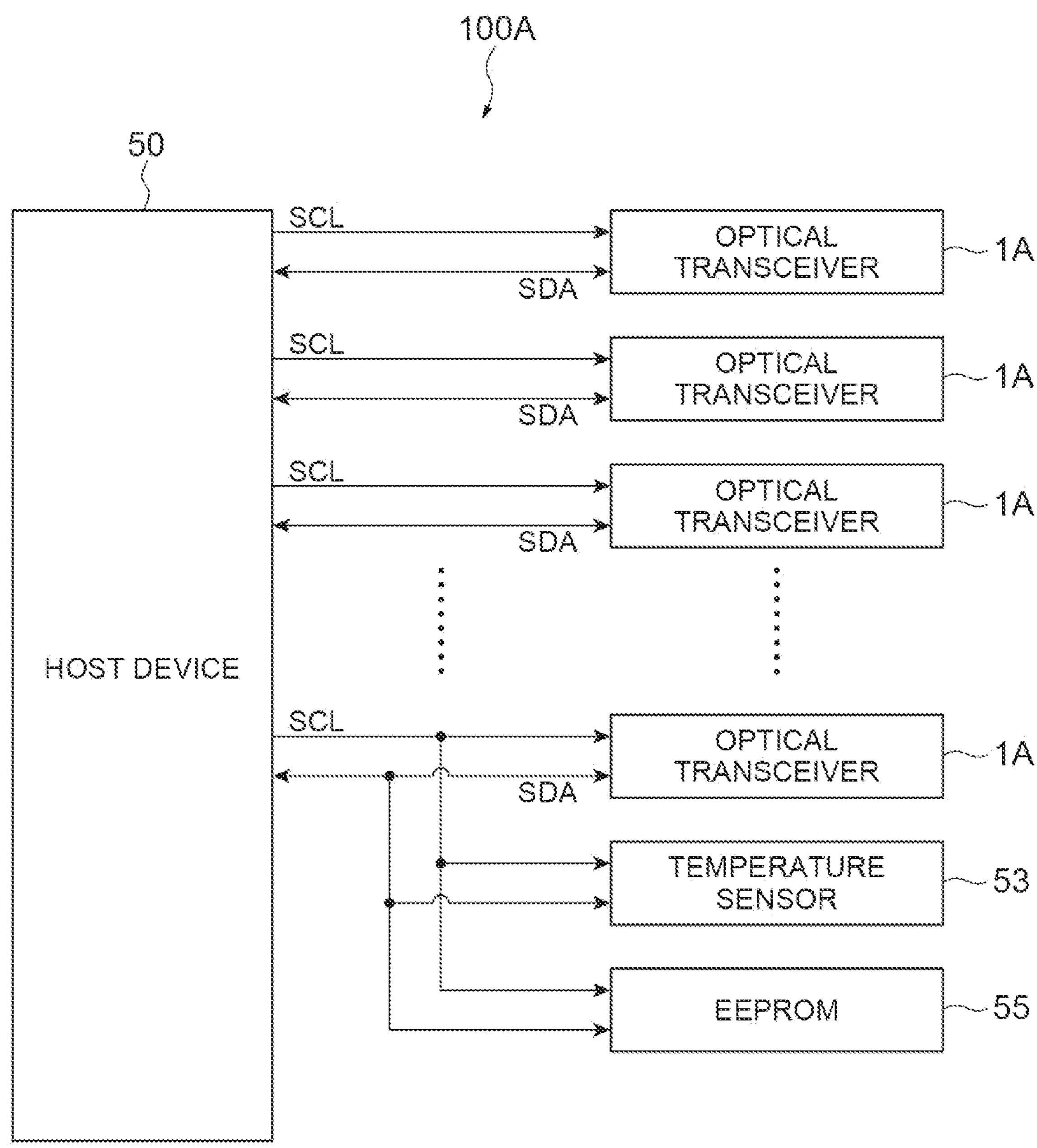
FIG. 3 is a view illustrating an example of a constitution of a transmission device including a plurality of optical transceivers according to the embodiment of the present disclosure.

For example, a transmission device 100A illustrated in FIG. 3 includes the host device 50, a plurality of optical transceivers 1A, a temperature sensor 53, and an electrically erasable programmable read-only memory (EEPROM). Each of the plurality of optical transceivers 1A is connected to the host device 50 through a communication line SCL and a communication line SDA. It is possible to perform I2C serial communication of transmitting and receiving data after a common slave address is designated from the host device 50 through the communication lines SCL and SDA. Here, the communication line SCL is a signal line for transmitting a clock signal, and the communication line SDA is a signal line for transmitting a data signal. The host device 50 is connected to the CPU 9 of each of the optical transceivers 1A through the communication line L1 (refer to FIG. 1). The host device 50 and the optical transceivers 1A perform communication for monitoring and controlling of the optical transceivers 1A through the communication line L1. For example, the host device 50 sends out a command or data to the communication line SDA as a master of serial communication, and the optical transceivers 1A in which a slave address is designated performs processing in accordance with a command or data received from the communication line SDA as a slave of serial communication.

In addition to these optical transceivers 1A, one optical transceiver 1A is connected to the host device 50 together with the temperature sensor 53 and the EEPROM 55, for example, through one communication line SCL for distributing a clock signal and the communication line SDA shared with the temperature sensor 53 and the EEPROM 55 and constituting one communication bus. Different slave addresses are respectively assigned to the foregoing one optical transceiver 1A, the temperature sensor 53, and the EEPROM 55 in advance. The host device 50 can perform I2C serial communication with any of the foregoing one optical transceiver 1A, the temperature sensor 53, and the EEPROM 55 after a slave address is designated and a destination is selected. For example, the temperature sensor 53 has a sensor element for detecting a temperature and a sensor circuit for converting a temperature detection signal from the sensor element into a digital signal allowing serial communication and has a function of performing serial communication with the host device 50 through the communication line SCL and the communication line SDA. For example, the sensor element is a resistance temperature detector. The resistance temperature detector has characteristics in which an electrical resistance changes in accordance with the temperature. For example, the temperature sensor 53 can detect a temperature by detecting change in electrical resistance by means of a temperature detection signal. For example, the EEPROM 55 stores a program which can be executed by the CPU 9, information which is referred to when monitoring and controlling of the optical transceivers 1A are performed, and the like.

In the transmission device 100A having such a constitution, hot-plugging of the plurality of optical transceivers 1A can be performed. For example, the optical transceivers 1A are constituted as optical transceivers which are hot-pluggable with respect to the host device 50, and terminals of the optical transceivers 1A can be connected in a state in which a power supply voltage is supplied to an electrical connector of the host device 50. Inserting and removing the optical transceivers 1A into and from the host device in a state in which a power supply voltage is supplied to the electrical connector of the host device 50 are referred to as hot-plugging. When the optical transceivers 1A are hot-plugged (inserted) into the host device 50, the temperature sensor 53 and the EEPROM 55 are connected to the communication line SCL and the communication line SDA in a state in which serial communication can be performed with the host device 50. Therefore, the optical transceivers 1A are provided with a mechanism for reducing an influence on serial communication between the temperature sensor 53 or the EEPROM 55 and the host device 50 when they are hot-plugged (details will be described below).

Figure 4:
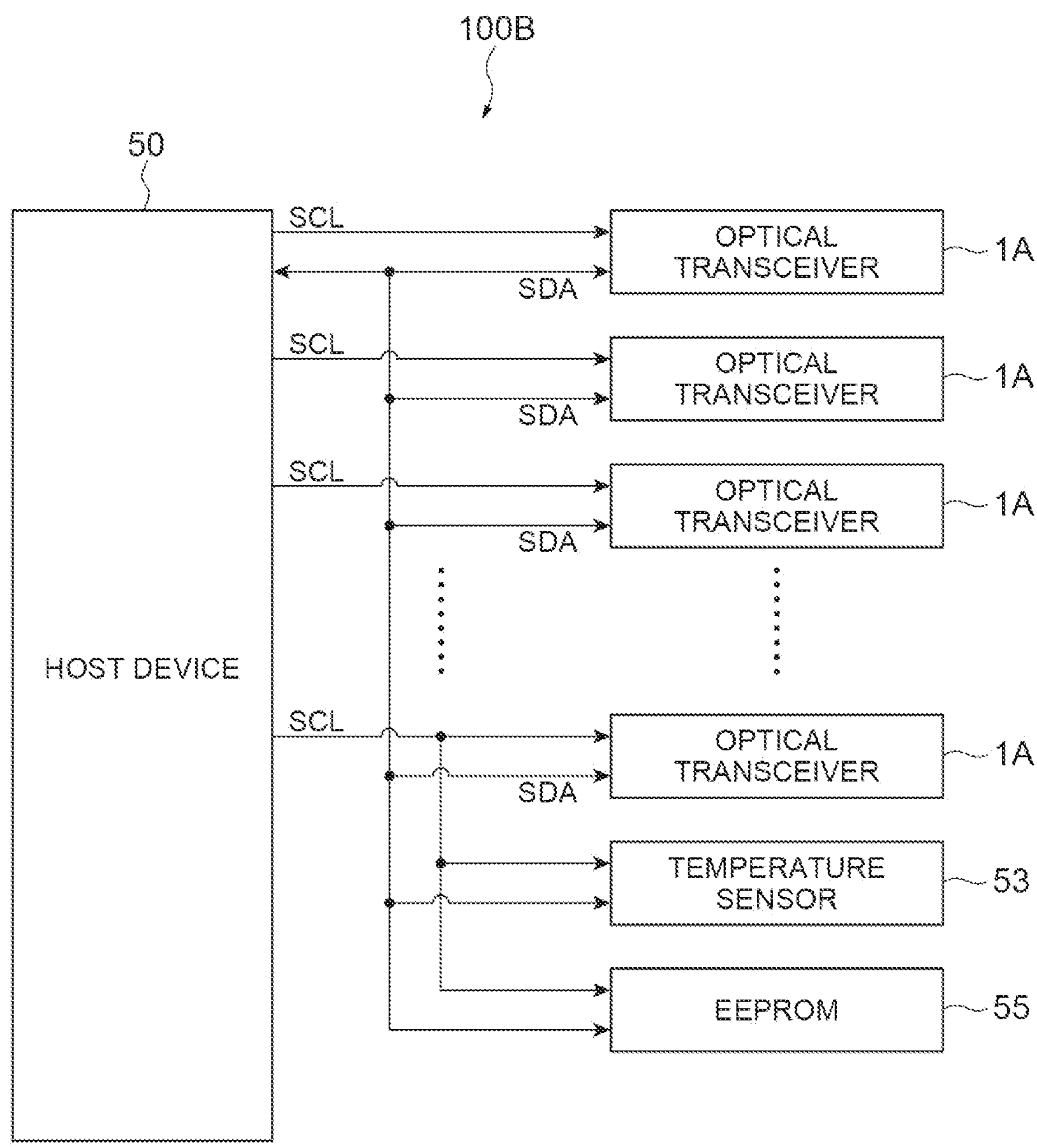
FIG. 4 is a view illustrating an example of a constitution of another transmission device including a plurality of optical transceivers according to the embodiment of the present disclosure.

A transmission device 100B illustrated in FIG. 4 includes constituent elements similar to those of the foregoing transmission device 100A but differs from the foregoing transmission device 100A in constitution of the communication lines SCL and SDA for serial communication. That is, in the transmission device 100B, the communication line SDA serves as a communication bus shared by all the optical transceivers 1A, the temperature sensor 53, and the EEPROM 55. The communication lines SCL are provided separately for a plurality of optical transceivers 1A to which the same slave address is assigned. However, the temperature sensor 53 and the EEPROM 55 are connected to one communication line SCL provided with respect to one optical transceiver 1A. Hereinafter, a plurality of constituent elements connected to a single communication line SDA as slaves of serial communication may be generically referred to as slave instruments. Due to such a connection constitution, serial communication can be performed with a desired slave instrument by designating a slave address of each slave instrument from the host device 50, selecting a destination of serial communication, and supplying a clock signal onto the communication line SCL connected to the actually operating slave instrument among these. The transmission device 100B having such a constitution is also constituted such that hot-plugging of the plurality of optical transceivers 1A can be performed. Therefore, the optical transceivers 1A are provided with a mechanism for reducing an influence on serial communication of other slave instruments, which are in a state of being already connected to the communication line SDA when they are hot-plugged and being able to perform serial communication, with the host device 50 (details will be described below).

(Constitution of Main Part of Optical Transceiver)

Figure 5:
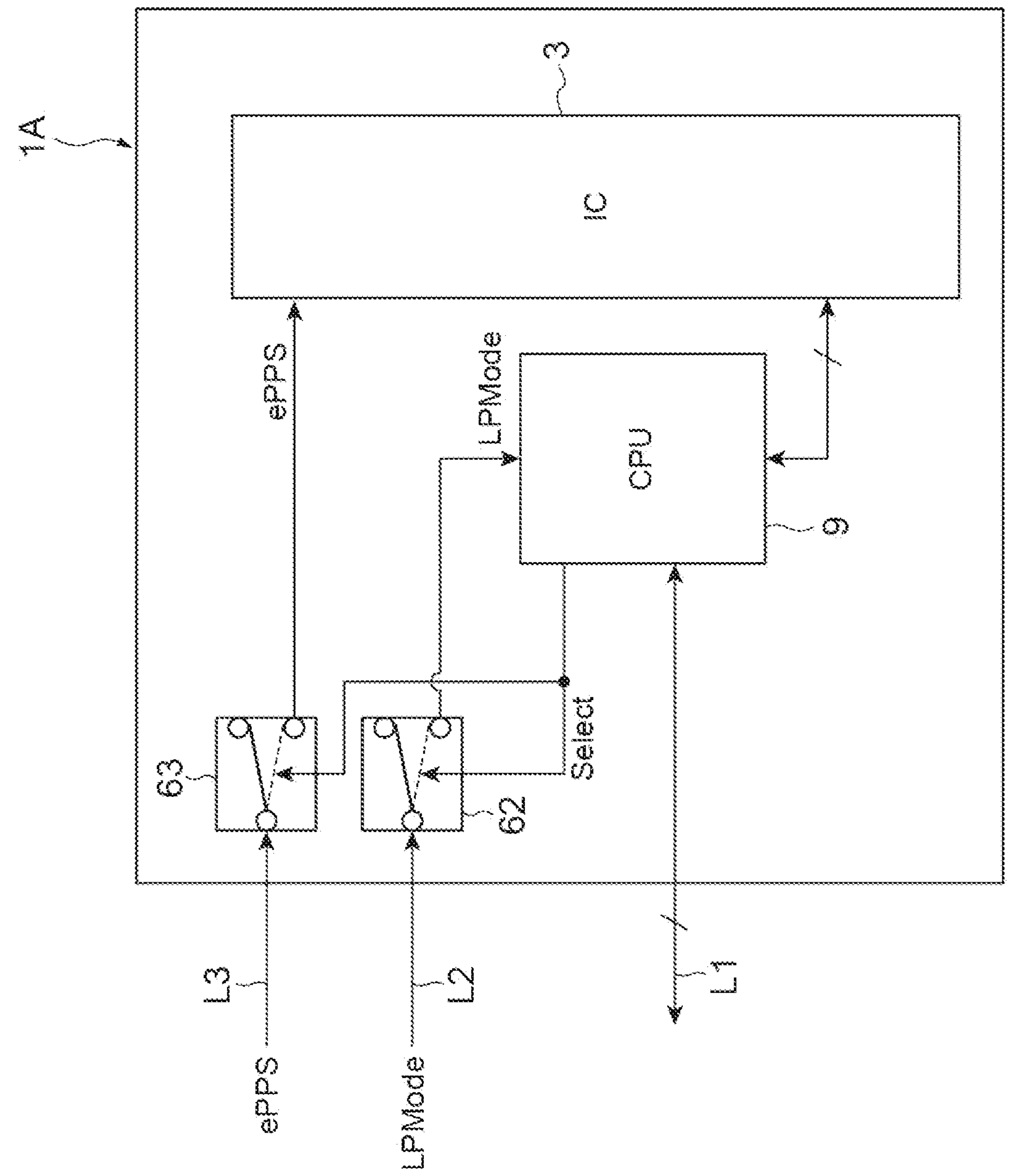
FIG. 5 is a view illustrating a constitution of a main part inside the optical transceiver.

FIG. 5 is a view illustrating a constitution of a main part inside the optical transceiver 1A. Here, only the foregoing constituent elements related to the mechanism for reducing an influence on serial communication are illustrated, and other circuits, components, and the like are omitted. The optical transceiver 1A is provided with a switch (first switch) 62 connected to the signal line L2 for receiving the control signal LPMode, and a switch (second switch) 63 connected to the signal line L3 for receiving the clock signal ePPS. The switch 62 is a switch for turning on and off electrical connection between the signal line L2 and the CPU 9, and the switch 63 is a switch for turning on and off electrical connection between the signal line L3 and the integrated circuit 3. In the switches 62 and 63, an electrical signal is transferred by turning on electrical connection, and transfer of an electrical signal is blocked by turning off electrical connection. The switches 62 and 63 may be mechanical switches or may be electronic switches into which a semiconductor is built. Each of the switches 62 and 63 is constituted to switch from a non-connected state (off) to a connected state (on) and maintain the connected state when a selection signal (switching signal) Select is received from the CPU 9. For example, the switches 62 and 63 are turned on by raising the voltage of the selection signal with respect to a predetermined voltage level and are turned off by lowering the voltage of the selection signal with respect to the predetermined voltage level. In a state in which a power supply voltage is not supplied to the optical transceiver 1A from the host device 50 (for example, the optical transceiver 1A is not mounted in the host device), the selection signal Select is not generated from the CPU 9, and each of the switches 62 and 63 maintains the non-connected state. For example, the switches 62 and 63 are constituted to be turned off when the voltage of the selection signal Select is zero. For example, an analog switch is an example of such switches 62 and 63. Examples of an analog switch include product number MAX14689 of Analog Devices, Inc., USA. Analog Switch MAX14689 includes two independent switches in one package. In a state in which a power supply voltage is not supplied, each switch is in a high impedance state. The non-connected state described above is also referred to as a high impedance state.

Figure 6:
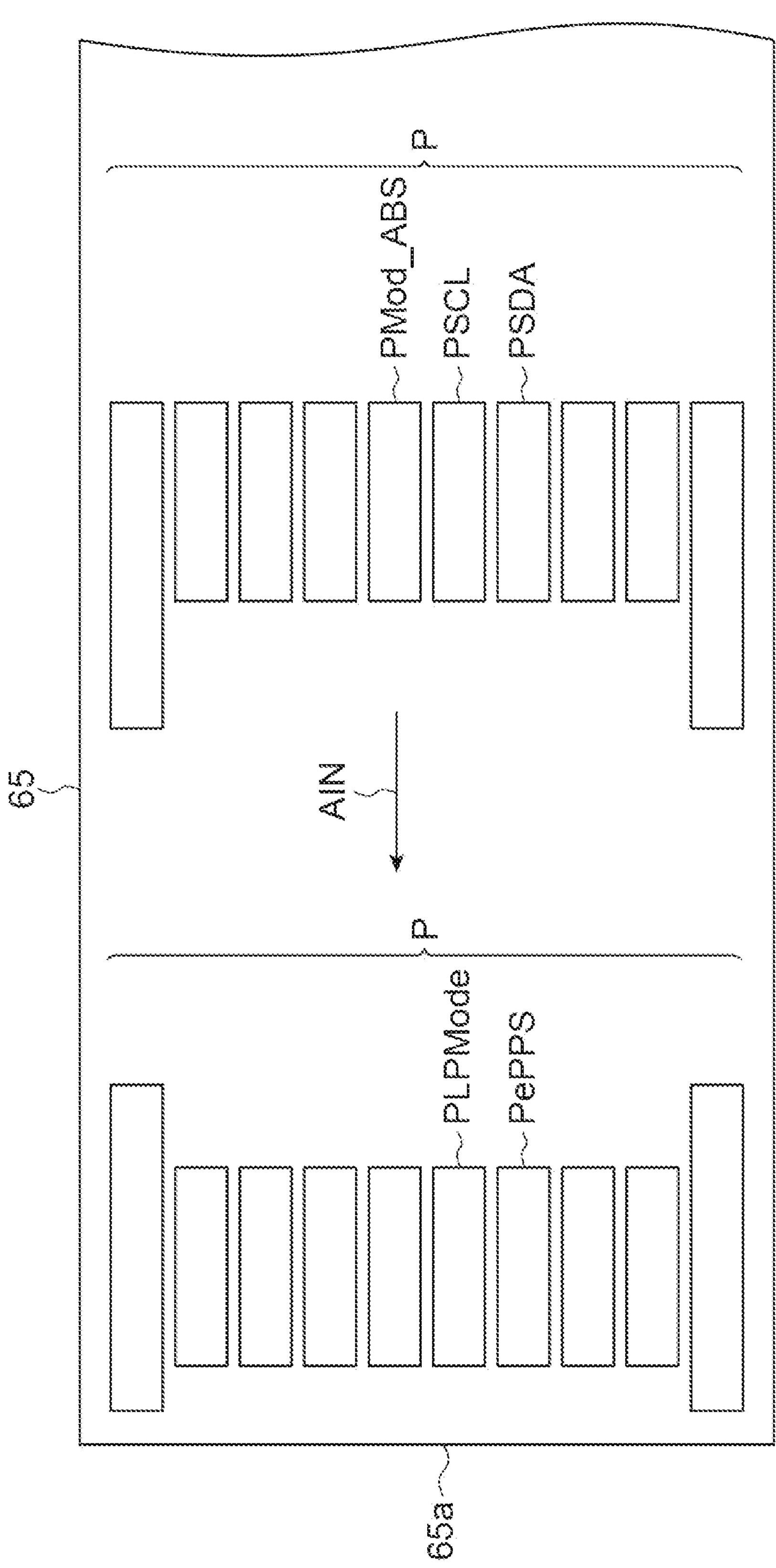
FIG. 6 is a plan view illustrating terminal disposition of a connector of the optical transceiver.
Figure 7:
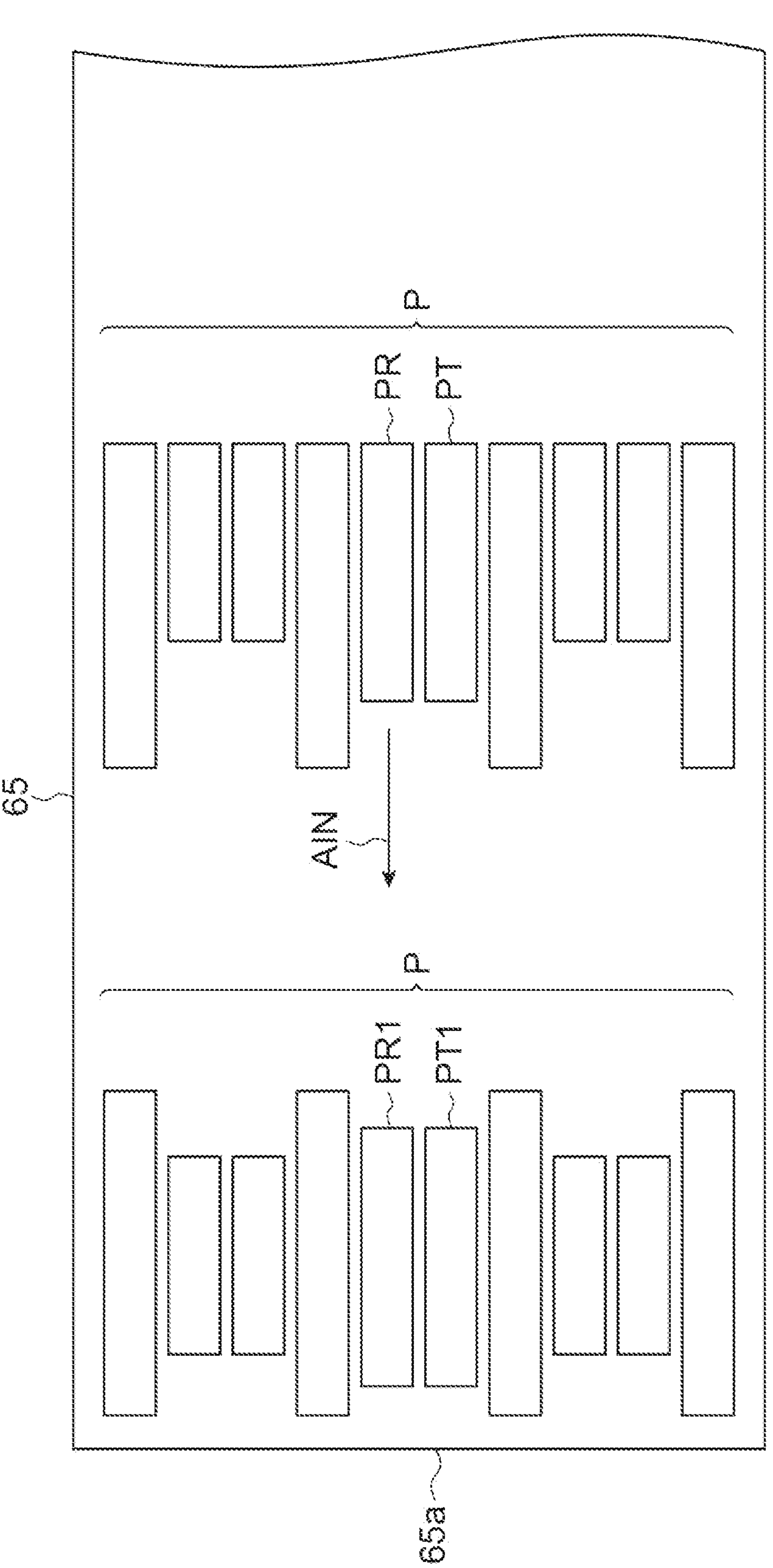
FIG. 7 is a plan view illustrating terminal disposition of the connector of the optical transceiver.

Next, a structure of an electrical connector (connector) 65 of the optical transceiver 1A for connection to the host device 50 will be described. FIG. 6 illustrates disposition of signal terminals and power supply terminals in a first stage of the connector 65, FIG. 7 illustrates disposition of signal terminals and power supply terminals in a second stage. FIG. 6 and FIG. 7 illustrate disposition of the signal terminals in a hot-plugging direction of the optical transceiver 1A of the connector 65, and a direction AIN indicates the hot-plugging direction (first direction). For example, when the optical transceiver 1A is inserted into the cage included in the host device 50 in the direction AIN and the connector 65 is engaged to a receptacle connector inside the cage, the terminals included in the respective connectors are connected to each other and a power supply voltage is supplied from the host device 50. In accordance with this, the optical transceiver 1A starts activation processing. The receptacle connector will be described below. The connector 65 of the optical transceiver 1A is also referred to as a plug, and a receptacle of the host device 50 is also referred to as a socket.

In the optical transceiver 1A, the terminals in the first stage illustrated in FIG. 6 are formed on one side (bottom side) of a printed board, and the terminals in the second stage illustrated in FIG. 7 are formed on the other side (top side) on a side opposite to the one side of the printed board. That is, the connector 65 has a structure of the first stage illustrated in FIG. 6 on a bottom side of the printed board and has a structure of the second stage illustrated in FIG. 7 on a top side of the printed board. FIG. 6 and FIG. 7 illustrate disposition of the terminals when each side of the printed board is viewed in a plan view from outside. In the first stage, a plurality of terminals P arranged in a direction crossing and perpendicular to the direction AIN (lateral direction, a second direction) are disposed in two rows, namely a first row and a second row within a plane. Similarly, in the second stage, a plurality of terminals P arranged in the lateral direction are disposed in two rows, namely a first row and a second row within a plane. Therefore, the first rows in which a plurality of terminals are arranged in the lateral direction and the second rows in which a plurality of terminals are arranged in the lateral direction are disposed in the direction AIN. The first stage and the second stage of connector 65 are opposite to each other in a third direction crossing the direction AIN and the lateral direction. In FIG. 6 and FIG. 7, a distal end 65*a* represents one end of the foregoing printed board on the host device 50 side when the optical transceiver 1A is hot-plugged into the host device 50. The distal end 65*a* is inserted toward the cage when the optical transceiver 1A is hot-plugged into the host device 50. Therefore, when the optical transceiver 1A is hot-plugged into the host device 50, the first rows are first inserted into the cage and the second rows are later inserted into the cage.

At the center position in the second row from the distal end 65*a* side of the connector 65 in the first stage, a signal terminal (first signal pad) PSCL, a signal terminal (second signal pad) PSDA, and a signal terminal (fifth signal pad) PMod_ABS are arranged side by side in the lateral direction. The signal terminal (first signal pad) PSCL is used for the communication line SCL in serial communication and is connected to the communication line L1 inside the optical transceiver 1A. The signal terminal (second signal pad) PSDA is used for the communication line SDA in serial communication and is connected to the communication line L1 inside the optical transceiver 1A. The signal terminal (fifth signal pad) PMod_ABS is used for the detection signal Mod_ABS and is connected to the signal line L6 inside the optical transceiver 1A. Further, in the first row from the distal end 65*a* side in the first stage, a signal terminal (third signal pad) PLPMode is provided at a position arranged in the direction AIN with respect to the signal terminal PSCL, and a signal terminal (fourth signal pad) PePPS is provided a position arranged in the direction AIN with respect to the signal terminal PSDA. The signal terminal PLPMode and the signal terminal PePPS are arranged side by side in the lateral direction. In the following description, in the first stage and the second stage, a row closer to the distal end 65*a* will be referred to as the first row, and a row farther than the first row from the distal end 65*a* will be referred to as the second row. In the direction AIN, the first row is provided between the distal end 65*a* and the second row. Therefore, in the first row and the second row in the first stage, the signal terminals PSCL and PLPMode are disposed at the same position in the lateral direction. Similarly, in the first row and the second row in the first stage, the signal terminals PSDA and PePPS are disposed at the same position in the lateral direction. The signal terminal (third signal pad) PLPMode is used for the control signal LPMode and is connected to the signal line L2 inside the optical transceiver 1A. The signal terminal (fourth signal pad) PePPS is used for the clock signal ePPS and is connected to the signal line L3 inside the optical transceiver 1A.

In addition, at the center position in the second row of the connector 65 in the second stage, a power supply terminal (first power pad) PR and a power supply terminal (second power pad) PT are disposed side by side in the lateral direction. That is, the power supply terminals PR and PT are disposed side by side with the signal terminals PSCL and PSDA along a plane perpendicularly intersecting the direction AIN (intersecting plane). The power supply terminals PR and PT are opposite to the signal terminals PSCL and PSDA along the intersecting plane. The power supply terminal (first power pad) PR is used for the power supply voltage VccR for optical receiving and is connected to the power supply line L8 inside the optical transceiver 1A. The power supply terminal (second power pad) PT is used for the power supply voltage VccT for optical transmitting and is connected to the power supply line L7 inside the optical transceiver 1A. Further, in the first row in the second stage, a power supply terminal (third power pad) PR1 is provided at a position arranged in the direction AIN with respect to the power supply terminal PR, and a power supply terminal (fourth power pad) PT1 is provided at a position arranged in the direction AIN with respect to the power supply terminal PT. The power supply terminal (third power pad) PR1 is used for the power supply voltage VccR1 for optical receiving and is connected to the power supply line L8 inside the optical transceiver 1A. The power supply terminal (fourth power pad) PT1 is used for the power supply voltage VccT1 for optical transmitting and is connected to the power supply line L7 inside the optical transceiver 1A. That is, the power supply terminals PR1 and PT1 are disposed side by side with the signal terminals PLPMode and PePPS along the intersecting plane. The power supply terminals PR1 and PT1 are opposite to the signal terminals PLPMode and PePPS along the intersecting plane. Therefore, in the first row and the second row in the second stage, the power supply terminals PR and PR1 are disposed at the same position in the lateral direction. Similarly, in the first row and the second row in the second stage, the power supply terminals PT and PT1 are disposed at the same position in the lateral direction. The power supply terminals PR and PT in the second stage and the signal terminals PSCL and PSDA in the first stage are disposed in the second row in the respective planes, and the power supply terminals PR1 and PT1 and the signal terminals PLPMode and PePPS are disposed in the first row in the respective planes.

Figure 8:
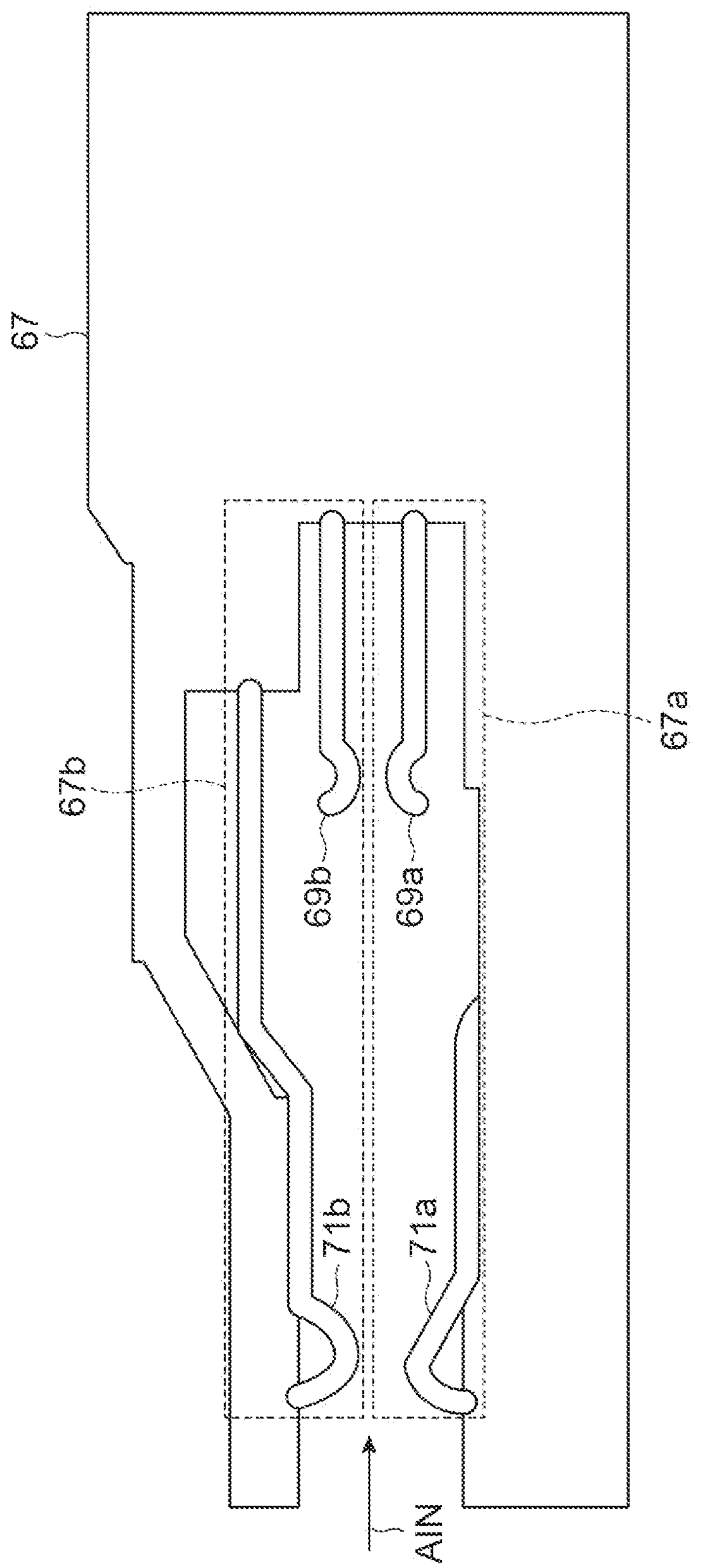
FIG. 8 is a cross-sectional view illustrating a structure of a receptacle connector of a host device.

FIG. 8 is a cross-sectional view illustrating a structure of a receptacle connector 67 of the host device 50. In this manner the receptacle connector (connection portion) 67 has contact portions 67*a* and 67*b* in two stages corresponding to the structure of the connector 65. A terminal 69*a* and a terminal 71*a* are provided side by side in the direction AIN of hot-plugging in the contact portion 67*a* in the first stage. The terminal 69*a* is used for connection to the terminal P in the first row in the first stage of the connector 65, and the terminal 71*a* is used for connection to the terminal P in the second row in the first stage of the connector 65. In addition, similarly, a terminal 69*b* and a terminal 71*b* are provided side by side in the direction AIN of hot-plugging in the contact portion 67*b* in the second stage. The terminal 69*b* is used for connection to the terminals P in the first row in the second stage of the connector 65, and the terminal 71*b* is used for connection to the terminal P in the second row in the second stage of the connector 65. When the optical transceiver 1A is hot-plugged with respect to the host device 50 having the receptacle connector 67 having such a structure in which the terminals are provided in two rows in the direction AIN of hot-plugging, the terminals in the first row of the connector 65 temporarily come into contact with the terminal 71*a* for connection to the terminals in the second row of the connector 65 in the receptacle connector 67, then reach at the terminal 69*a*, and are permanently connected thereto. Specifically, the signal terminal PLPMode of the connector 65 comes into contact while passing through the terminal 71*a* for connection to the signal terminal PSCL in the receptacle connector 67 and is then ultimately connected to the terminal 69*a* for connection to the signal terminal PLPMode. Namely, the signal terminal PLPMode is inserted into the receptacle connector 67 prior to the signal terminal PSCL. In addition, the signal terminal PePPS of the connector 65 temporarily comes into contact with the terminal 71*a* for connection to the signal terminal PSDA in the receptacle connector 67 and is then permanently connected to the terminal 69*a* for connection to the signal terminal PePPS. Namely, the signal terminal PePPS is inserted into the receptacle connector 67 prior to the signal terminal PSDA. Regarding the terminals in the first row, the positions and the shapes of the terminals are set such that the power supply terminals PR1 and PT1 in the second stage are connected to the respective terminals corresponding to those of the receptacle connector 67 prior to the signal terminals PLPMode and PePPS in the first stage. For example, one ends of the power supply terminals PR1 and PT1 in the second stage in the direction AIN are formed at positions closer to the distal end 65*a* than one ends of the signal terminals PLPMode and PePPS in the first stage. Similarly, regarding the terminals in the second row, the positions and the shapes of the terminals are set such that the power supply terminals PR and PT in the second stage are connected to the respective terminals corresponding to those of the receptacle connector 67 prior to the signal terminals PSCL and PSDA in the first stage. For example, one ends of the power supply terminals PR and PT in the second stage in the direction AIN are formed at positions closer to the distal end 65*a* than one ends of the signal terminals PSCL and PSDA in the first stage.

Returning to FIG. 5, operation of the switches 62 and 63 of the CPU 9 will be described. After the optical transceiver 1A is hot-plugged and the connector 65 is completely inserted into the receptacle connector 67, the CPU 9 receives an activation instruction from the reset circuit 11 which has detected a rise of the power supply voltages VccT and VccT1 or the power supply voltages VccR and VccR1. In accordance with this, the CPU 9 starts the activation processing, generates the selection signal Select in the process of the activation processing, and transfers it to the switches 62 and 63. As a result, at a timing when hot-plugging of the optical transceiver 1A is completed, the state between the signal terminal PLPMode and the CPU 9 switches from the non-connected state to the connected state, and the state between the signal terminal PePPS and the integrated circuit 3 switches from the non-connected state to the connected state. Namely, the switch 62 isolates (disconnects) the signal terminal PLPMode from the CPU 9 when the connecter 65 is not engaged with the receptacle connector 67, and the optical transceiver 1A is not fully inserted to the host device 50. The switch 62 put the signal terminal PLPMode electrically connected to the CPU 9 in accordance with the selection signal Select when the optical transceiver 1A is fully inserted to the host device 50. The switch 63 isolates (disconnects) the signal terminal PePPs from the integrated circuit 3 when the connecter 65 is not engaged with the receptacle connector 67, and the optical transceiver 1A is not fully inserted to the host device 50. The switch 63 put the signal terminal PePPS electrically connected to the integrated circuit 3 in accordance with the selection signal Select when the optical transceiver 1A is fully inserted to the host device 50.

According to the optical transceiver 1A described above, when hot-plugging of the optical transceiver 1A with respect to the host device 50 is started, if the signal terminals PLPMode and PePPS temporarily come into contact with the terminal 71*a* for connection to the signal terminal PSCL and the terminal 71*a* for connection to the signal terminal PSDA respectively in the receptacle connector 67 of the host device 50, the state between the signal terminals PLPMode and PePPS and the internal circuit of the optical transceiver 1A is set to the non-connected state. Moreover, when hot-plugging of the optical transceiver 1A is completed (the connector 65 is completely inserted into the receptacle connector 67), the selection signal Select is generated by the CPU 9, and the state between the signal terminals PLPMode and PePPS and the internal circuit of the optical transceiver 1A is set to the connected state by the switch 62 and the switch 63. Accordingly, when the optical transceiver 1A is hot-plugged, even if each of the signal terminals PLPMode and PePPS of the optical transceiver 1A temporarily comes into contact with the terminal 71*a* for connection for serial communication on the host device 50 side, an unintended voltage can be prevented from being applied to the terminal 71*a* for connection for serial communication on the host device 50 side through the internal circuit of the optical transceiver 1A. Accordingly, it is possible to reduce an influence on ongoing serial communication of other slave instruments inside the transmission devices 100A and 100B.

Incidentally, the connector 65 also has a signal terminal in addition to the signal terminals PLPMode, PePPS, PSCL, and PSDA. When the optical transceiver 1A is hot-plugged into the host device 50, the internal circuit (interface circuit) of the optical transceiver 1A is electrically connected to the host device 50 through these signal terminals. The optical transceiver 1A may include a circuit other than those electrically connected to the host device 50. In the present disclosure, a circuit internally provided in the optical transceiver 1A, that is, a circuit electrically connected to the host device 50 through the connector 65 is particularly referred to as an internal circuit. For example, the internal circuit includes the integrated circuit 3 and the CPU 9.

Here, in the present embodiment, the switch 62 causes the signal terminal PLPMode to be in the non-connected state when a power supply voltage is not supplied to the optical transceiver 1A from the host device 50, and the switch 63 causes the signal terminal PePPS to be in the non-connected state when a power supply voltage is not supplied to the optical transceiver 1A from the host device 50. In this case, each of the switch 62 and the switch 63 causes the signal terminals PLPMode and PePPS to be in the non-connected state when power is not supplied to the optical transceiver 1A from the host device 50 before the optical transceiver 1A is hot-plugged. As a result, when the optical transceiver 1A is hot-plugged, an unintended voltage can be prevented from being applied to the terminal 71*a* for connection for serial communication on the host device 50 side. Accordingly, it is possible to reliably reduce an influence on serial communication of other slave instruments due to hot-plugging of the optical transceiver 1A inside the transmission devices 100A and 100B.

In addition, in the present embodiment, the CPU 9 generates the selection signal Select upon detection of supply start of a power supply voltage by the reset circuit 11 from the host device 50 to the optical transceiver 1A. In this case, each of the switch 62 and the switch 63 causes the signal terminals PLPMode and PePPS to be in the connected state after hot-plugging of the optical transceiver 1A is completed, the connector of the optical transceiver 1A and the receptacle connector 67 of the host device 50 are completely engaged to each other, and power supply from the host device 50 to the optical transceiver 1A is started. Accordingly, the optical transceiver 1A can stably start the activation processing inside the transmission devices 100A and 100B.

FIG. 9 is a timing chart showing a timing of generating a telegraphic message of serial communication transmitted and received by a slave instrument other than the optical transceiver 1A in the host device 50, and a timing of change in the connected state in the internal circuit of the optical transceiver 1A according to the present embodiment. In this manner, when hot-plugging of the optical transceiver 1A into the host device 50 is started while a telegraphic message (Read/Write telegraphic message) of serial communication is transceived with respect to the host device 50 by a slave instrument other than the optical transceiver 1A in the host device 50, the state with respect to the contact portions 67*a* and 67*b* of the receptacle connector 67 changes from the non-connected state (N.C.: Non-connect) to the connected state (C.: Connect) in the order of the power supply terminals PR1, PT1, PR, and PT, and the signal terminals PLPMode, PePPS, PSCL, and PSDA. More specifically, since one end of each of the power supply terminals PR1 and PT1 is closer to the distal end 65*a* than one ends of other terminals and is provided at substantially the same distance from the distal end 65*a*, the power supply terminals PR1 and PT1 are temporarily in the connected state first substantially at the same timing as each other after hot-plugging has started. That is, in this process of hot-plugging, since each of the power supply terminals PR1 and PT1 passes through the terminal 71*b* for connection of the power supply terminals PR and PT of the receptacle connector 67, then reaches the terminal 69*b* for connection of the power supply terminals PR1 and PT1, and is connected thereto, the voltage instantly rises to a power supply voltage Vcc, then falls once, and rises to the power supply voltage Vcc again. Subsequently, since one end of each of the signal terminals PLPMode and PePPS is closer to the distal end 65*a* than other terminals in the second row and is provided at substantially the same distance from the distal end 65*a*, the signal terminals PLPMode and PePPS physically come into contact with the terminals of the receptacle connector 67 next. More specifically, each of the signal terminals PLPMode and PePPS temporarily comes into contact with the terminal 71*a* for connection of the signal terminals PSCL and PSDA of the receptacle connector 67, then reaches the terminal 69*a* for connection of the signal terminals PLPMode and PePPS, and is connected thereto. For this reason, when the switches 62 and 63 are not present, due to connection between the communication lines SCL and SDA for serial communication on the host device 50 side and the signal terminals PLPMode and PePPS on the optical transceiver 1A side, there is a probability that a low level voltage or an intermediate level voltage will be applied from the internal circuit of the optical transceiver 1A to the communication lines SCL and SDA, and there is concern that serial communication in the host device 50 may be affected. In the present embodiment, at a timing having a probability that the signal terminals PLPMode and PePPS will be connected to the communication lines SCL and SDA on the host device 50 side (period Ti in FIG. 9), since the signal terminals PLPMode and PePPS are maintained in the non-connected state due to action of the switches 62 and 63, an influence on serial communication of a slave instrument other than the optical transceiver 1A in the host device 50 can be prevented.

When hot-plugging is completed, in the connector 65 of the optical transceiver 1A and the receptacle connector 67 of the host device 50, the respective corresponding terminals are electrically connected to each other. At this time, after the power supply terminals PR, PT, PR1, and PT1 are in the connected state, the signal terminals PLPMode, PePPS, PSCL, and PSDA are in the connected state. The signal terminals PSCL and PSDA are directly connected to the internal circuit, and the signal terminals PLPMode and PePPS are connected to the internal circuit of the optical transceiver 1A after the switches 62 and 63 are in the connected state due to the selection signal Select generated by the CPU 9. Therefore, after the signal terminals PSCL and PSDA are connected to the internal circuit, the signal terminals PLPMode and PePPS may be connected to the internal circuit with a delay of a predetermined time. Although the voltages VccR1 and VccT1 supplied through the terminals PR1 and PT1 temporarily rise to the power supply voltage Vcc during hot-plugging as described above, the internal circuit is constituted such that the CPU 9 does not start activation and the signal Select is not output at this time. For example, a power supply wiring is constituted in the CPU 9 such that the power supply voltage Vcc is supplied through the power supply terminals PR and PT.

Here, an example in a case in which the switches 62 and 63 are constituted using the foregoing Analog Switch MAX14689 will be described. Analog Switch MAX14689 has a switch connecting one terminal COM1 to any one of two terminals NC1 and NO1 by means of a control signal CB. The terminal NC1 is a normally closed terminal, and the terminal COM1 is connected to the terminal NC1 unless the control signal CB is in a high level. The terminal NO1 is a normally open terminal, and the terminal COM1 is connected to the terminal NO1 only when the control signal CB is in a high level. Therefore, in the optical transceiver 1A, the terminal COM1 is connected to the signal terminal PLPMode, and the terminal NO1 is connected to the internal circuit. Moreover, the switch 62 is mounted such that the selection signal Select is input as the control signal CB. Accordingly, until the optical transceiver 1A is hot-plugged into the host device 50 and the selection signal Select is input to the switch 62, the signal line L2 is in the non-connected state with the internal circuit of the optical transceiver 1A. At this time, for example, the terminal NC1 remains open without having the internal circuit connected thereto.

Accordingly, even if the signal terminal PLPMode temporarily comes into contact with the terminal 71*a* for connection for serial communication of the receptacle connector 67 of the host device 50 during hot-plugging, occurrence of an influence on the signal line L2 can be avoided. Regarding the clock signal ePPS as well, by mounting the switch 63 in a manner similar to that of the switch 62, even if the signal terminal PePPS temporarily comes into contact with the terminal 71*a* for connection of the receptacle connector 67 of the host device 50 during hot-plugging, occurrence of an influence on the signal line L3 can be avoided.

Hereinabove, a principle of the present disclosure in a preferred embodiment has been illustrated and described. However, it will be appreciated by those skilled in the art that the present disclosure can be changed in disposition and details without departing from such a principle. The present disclosure is not limited to a particular constitution disclosed in the present embodiment. Therefore, all modifications and changes derived from the claims and the scope of the gist thereof will be claimed.

Figure 10:
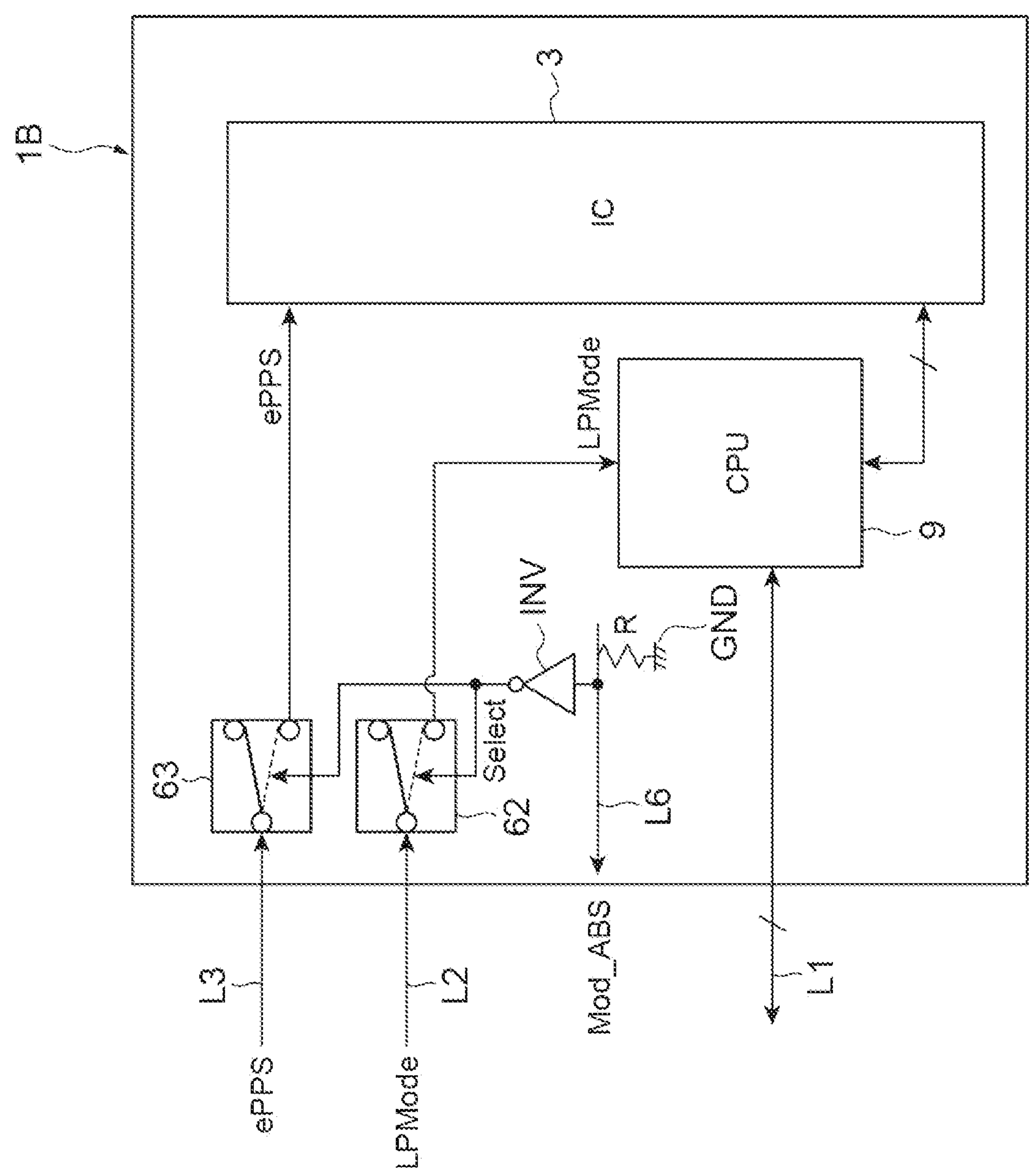
FIG. 10 is a view illustrating a constitution of a main part of an optical transceiver according to a modification example of the present disclosure.

FIG. 10 is a view illustrating a constitution of a main part of an optical transceiver 1B according to a modification example of the present disclosure. As illustrated in FIG. 10, the optical transceiver 1B of the present modification example differs from the optical transceiver 1A in constitution for generating the selection signal Select.

That is, the optical transceiver 1B includes an inverting circuit (switching signal circuit) INV having an input connected to the signal terminal PMod_ABS, generating the selection signal Select, and outputting it to the switches 62 and 63. In the optical transceiver 1B, the signal terminal PMod_ABS is connected to a ground wiring GND through a resistance element R. The ground wiring GND is a wiring connected to a ground terminal of the connector 65 and is set to a ground potential (grounding potential) when the optical transceiver 1B is hot-plugged into the host device 50. In the host device 50, in a state in which the optical transceiver 1B is not hot-plugged, the terminal of the receptacle connector 67 connected to the signal terminal PMod_ABS is constituted to be in a high level. When the optical transceiver 1B is hot-plugged into the host device 50, the signal Mod_ABS related to the signal terminal PMod_ABS is pulled down to the grounding potential by the resistance element R and is set to a low level. The host device 50 detects hot-plugging of the optical transceiver 1B by detecting change of the signal Mod_ABS from a high level to a low level. For example, the inverting circuit INV receives supply of the power supply voltage Vcc from the power supply terminals PR and PT of the connector 65. The inverting circuit INV is constituted such that an output is in a low level when the power supply voltage Vcc is not supplied. When the optical transceiver 1B is hot-plugged into the host device 50, the inverting circuit INV receives supply of the power supply voltage Vcc from the power supply terminals PR and PT and changes the output from a low level to a high level. For example, the switches 62 and 63 can be constituted to be in the non-connected state when the selection signal Select is set to a low level and to be in a conducting state when the selection signal Select is set to a high level. According to the present modification example, at a timing when hot-plugging of the optical transceiver 1B is completed and the power supply terminals PR and PT are connected to the receptacle connector 67 on the host device 50 side, the inverting circuit INV operates upon reception of the power supply voltage Vcc and changes the output from a low level to a high level. The signal terminals PLPMode and PePPS are switched from the non-connected state to the connected state by using an output of the inverting circuit INV as the selection signal Select of the switches 62 and 63. Accordingly, application of an unintended voltage to the terminal 71*a* for connection for serial communication on the host device 50 side can be reliably avoided. A delay time occurs until the power supply voltage Vcc is supplied to the inverting circuit INV and the output is in a high level. Therefore, similar to that illustrated in FIG. 9, the signal terminals PLPMode and PePPS are in the connected state later than the signal terminals PSCL and PSDA being in the connected state.

Figure 11:
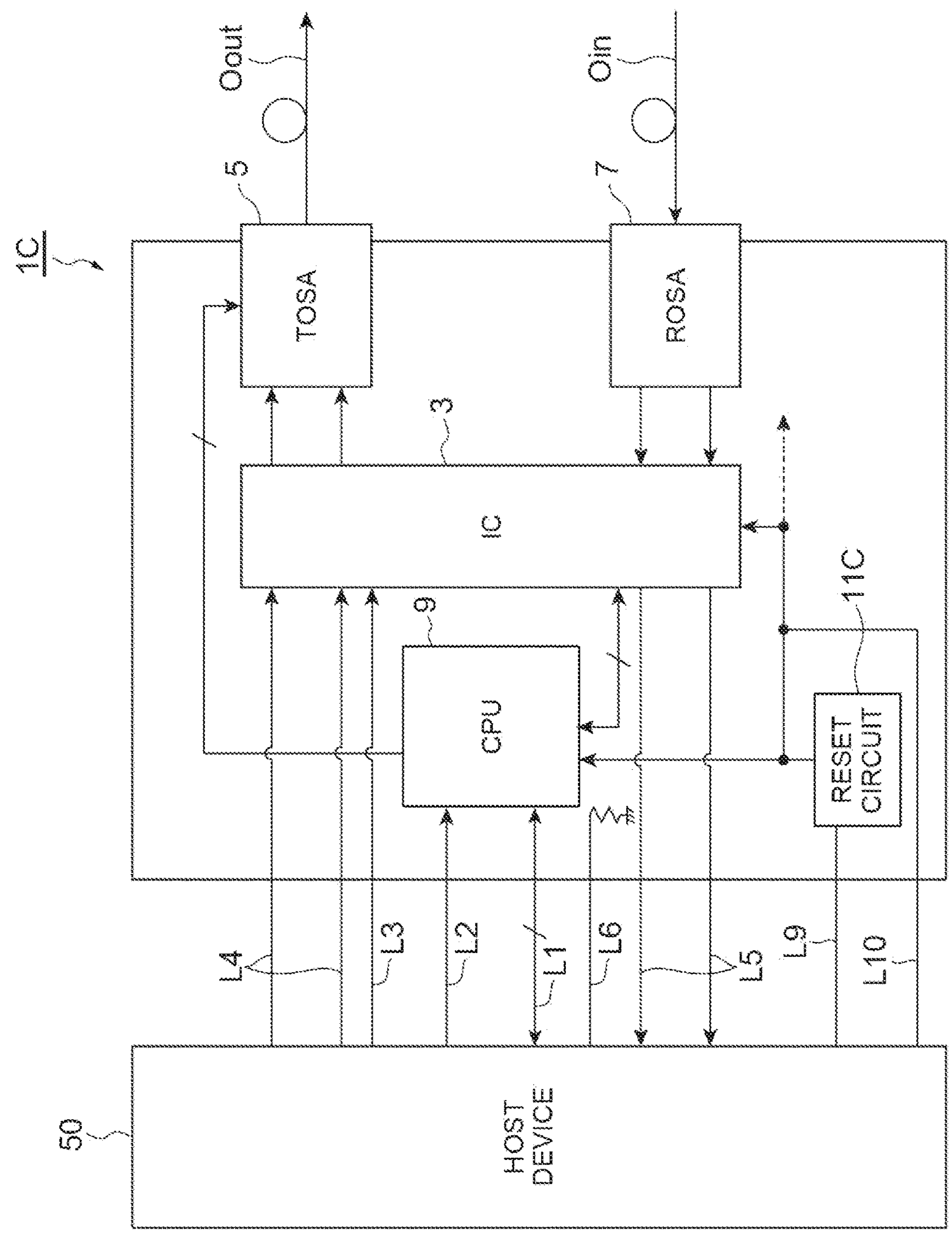
FIG. 11 is a view illustrating an overall constitution of an optical transceiver according to another modification example of the present disclosure.
Figure 12:
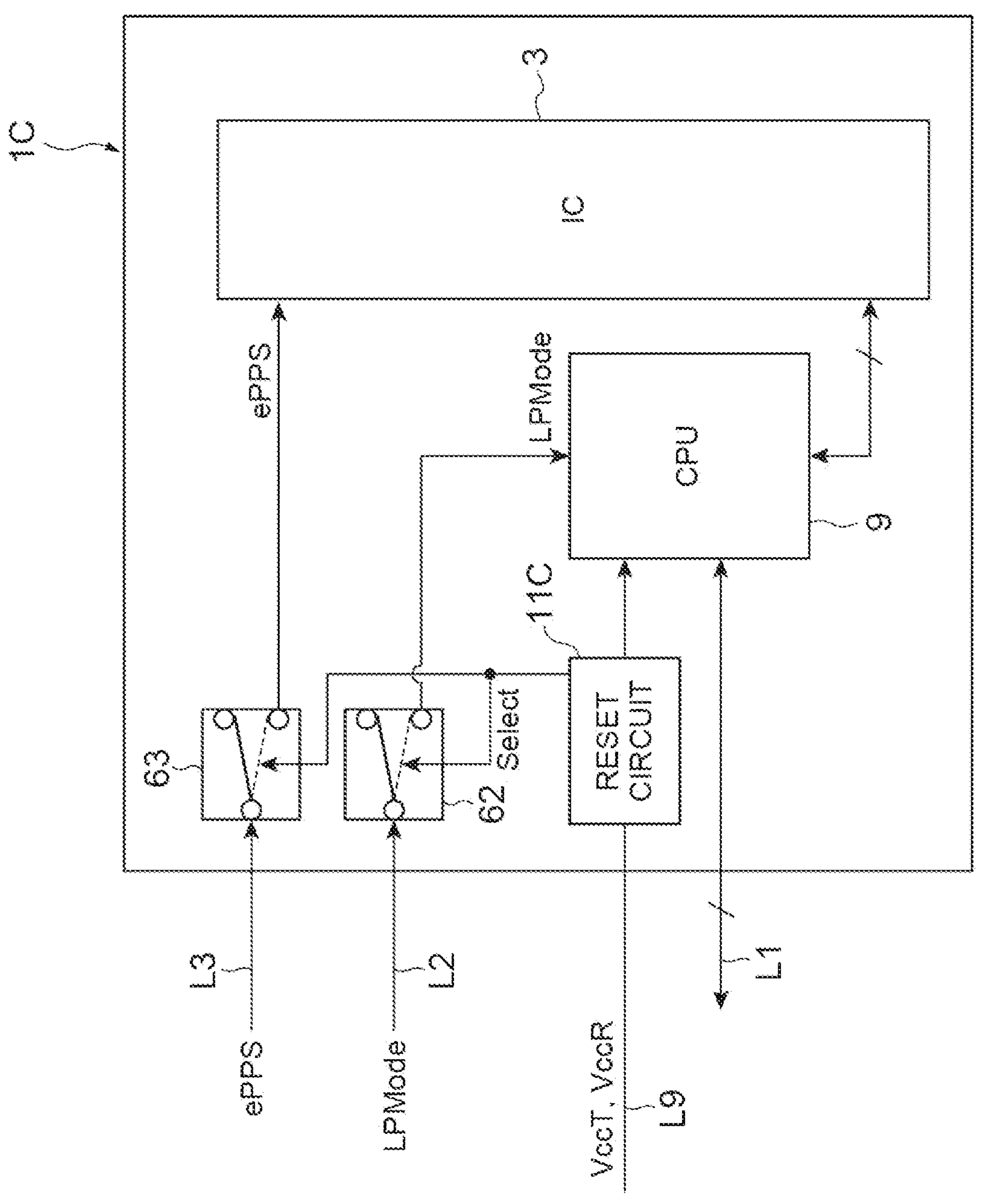
FIG. 12 is a view illustrating a constitution of a main part of the optical transceiver according to the modification example of the present disclosure.

FIG. 11 is a view illustrating an overall constitution of an optical transceiver 1C according to another modification example of the present disclosure, and FIG. 12 is a view illustrating a constitution of a main part of the optical transceiver 1C. As illustrated in FIG. 11 and FIG. 12, the optical transceiver 1C of the present modification example differs from the optical transceiver 1A in constitution for supplying a power supply voltage to the internal circuit and constitution for generating the selection signal Select.

That is, the optical transceiver 1C includes power supply lines L9 and L10. The power supply line L9 is a line for supplying the power supply voltage VccT for optical transmitting and the power supply voltage VccR for optical receiving from the host device 50, and the power supply line L10 is a line for supplying the power supply voltage VccT1 for optical transmitting and the power supply voltage VccR1 for optical receiving from the host device 50. Further, the power supply line L9 is connected to the power supply terminals PT and PR of the connector 65 inside the optical transceiver 1C. The power supply line L10 is connected to the power supply terminals PT1 and PR1 of the connector 65 inside the optical transceiver 1C. The power supply line L9, the power supply terminal PT, and the power supply terminal PR are isolated from the power supply line L10, the power supply terminal PT1, and the power supply terminal PR1. The power supply line L10 is connected to the internal circuit such as the integrated circuit 3 as a power supply line, thereby supplying the power supply voltage VccT1 for optical transmitting and the power supply voltage VccR1 for optical receiving to these circuits. The power supply line L9 is connected to the internal circuit such as the CPU 9 via a reset circuit 11C as a power supply line, thereby supplying the power supply voltage VccT for optical transmitting and the power supply voltage VccR for optical receiving to these circuits via the reset circuit 11C.

In addition, in the reset circuit 11C of the optical transceiver 1C, when the optical transceiver 1C is hot-plugged and power supply is received from the power supply terminals PT and PR in the second row in the second stage of the connector 65, at a timing when a rise of the power supply voltage to a predetermined voltage (for example, 2.9 V) or higher is detected, power supply to the CPU 9 is started, and the selection signal Select is generated and output to the switches 62 and 63.

According to the present modification example, after hot-plugging of the optical transceiver 1C is started, at a timing when the signal terminals PSCL and PSDA are connected to the terminal 71*a* for connection for serial communication of the host device 50, the power supply terminals PT and PR are connected to the terminal 71*b* for connection on the host device 50 side. In accordance with this, the signal terminals PLPMode and PePPS are switched from the non-connected state to the connected state in accordance with reception of supply of the power supply voltages VccT and VccR from the host device 50 through the power supply terminals PT and PR. Accordingly, application of an unintended voltage to the terminal 71*a* for connection for serial communication on the host device 50 side can be reliably avoided.

Figure 13:
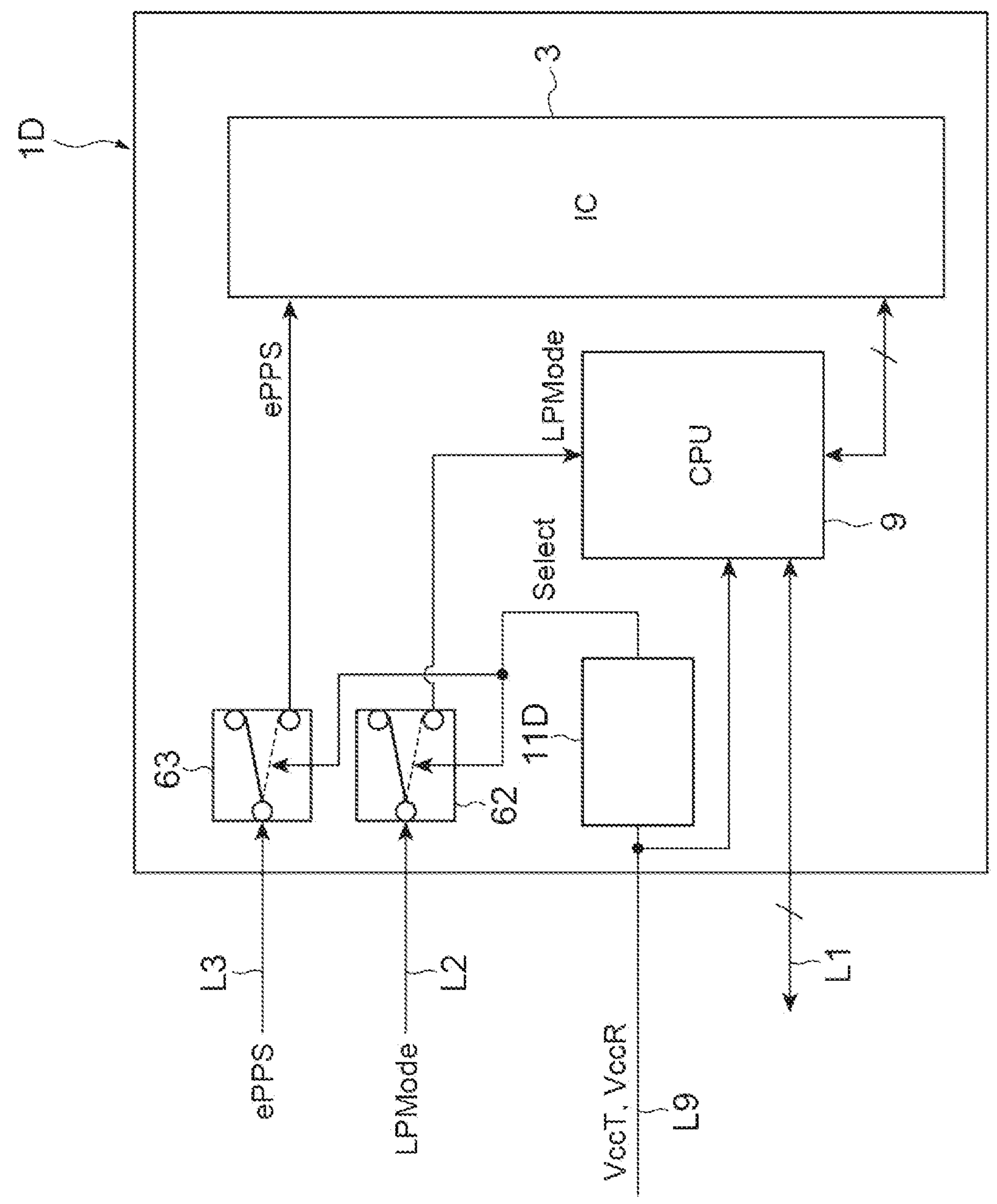
FIG. 13 is a view illustrating a constitution of a main part of an optical transceiver according to another modification example of the present disclosure.
Figure 14:
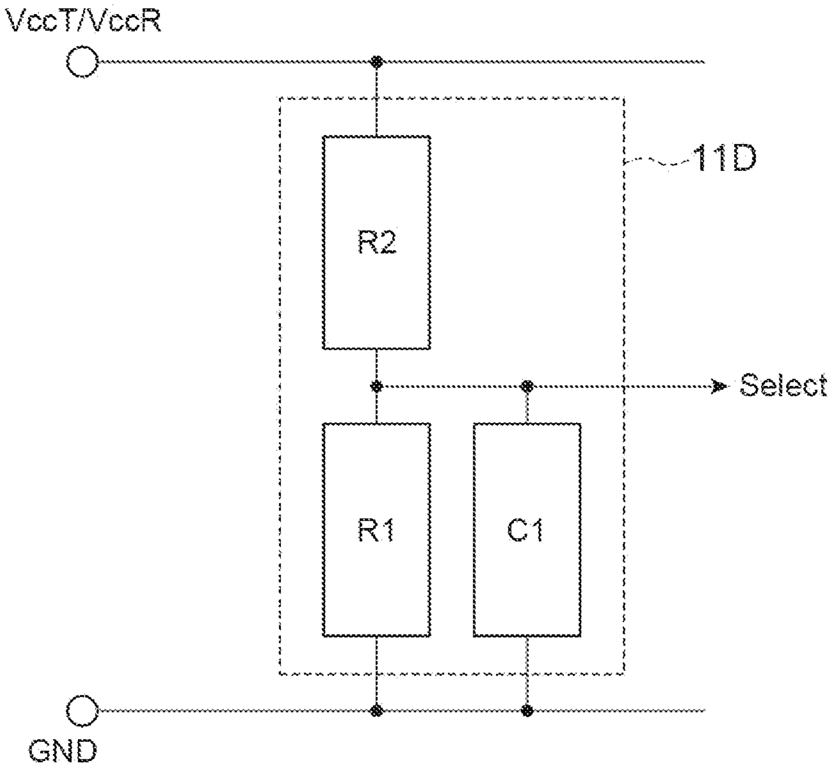
FIG. 14 is a circuit diagram showing an example of a constitution of a selection signal circuit in FIG. 13.

FIG. 13 is a view illustrating a constitution of a main part of an optical transceiver 1D according to further another modification example of the present disclosure. As illustrated in FIG. 13, the optical transceiver 1D of the present modification example differs from the optical transceiver 1A in constitution for supplying a power supply voltage to the internal circuit and constitution for generating the selection signal Select. More specifically, the optical transceiver 1D differs from the optical transceiver 1C in including a selection signal circuit (switching signal circuit) 11D in place of the reset circuit 11C. FIG. 14 illustrates an example of a circuit constitution of the selection signal circuit 11D.

For example, the selection signal circuit 11D includes resistance elements R1 and R2 connected to each other in series. A contact point where the resistance element R1 and the resistance element R2 are connected to each other generates the selection signal Select. One end opposite to the contact point of the resistance element R1 is connected to the ground wiring GND. One end opposite to the contact point of the resistance element R2 is connected to the power supply terminals PT and PR of the connector 65 through the power supply wiring. Immediately before the optical transceiver 1D is hot-plugged into the host device 50 and the power supply voltage Vcc is supplied from the host device 50 to the power supply terminals PT and PR, since the contact point between the resistance element R1 and the resistance element R2 is pulled down by the resistance element R1, the selection signal Select is set to a low level. When hot-plugging of the optical transceiver 1D is completed, the power supply voltage Vcc is supplied to the power supply terminals PT and PR, and the contact point between the resistance element R1 and the resistance element R2 is set to a voltage value corresponding to a resistance value of each of the resistance elements. For example, when a resistance value R1 of the resistance element R1 is set to 9 KΩ and a resistance value R2 of the resistance element R2 is set to 1 KΩ, and when the power supply voltage Vcc is 3.3 V, the voltage value of the contact point becomes 2.97 V. This corresponds to a high level of the selection signal Select. Therefore, before and after hot-plugging of the optical transceiver 1D is completed, the selection signal circuit 11D generates a signal changing from a low level to a high level and outputs it as the selection signal Select.

According to the present modification example, after hot-plugging of the optical transceiver 1D is started, at a timing when the signal terminals PSCL and PSDA are connected to the terminal 71*a* for connection for serial communication of the host device 50, the power supply terminals PT and PR are connected to the terminal 71*b* for connection on the host device 50 side. In accordance with this, the selection signal circuit 11D generates the selection signal Select in accordance with reception of supply of the power supply voltage Vcc from the host device 50 through the power supply terminals PT and PR. Accordingly, the switches 62 and 63 switch and the signal terminals PLPMode and PePPS are switched from the non-connected state to the connected state. Accordingly, application of an unintended voltage to the terminal 71*a* for connection for serial communication on the host device 50 side can be reliably avoided.

In the selection signal circuit 11D, a capacitance element C1 may be connected to the resistance element R1 in parallel. When the selection signal Select changes from a low level to a high level, since the capacitance element C1 is charged by a current flowing into the contact point through the resistance element R2, a rise of a voltage at the contact point is delayed. More specifically, a part of a current flowing into the contact point through the resistance element R2 flows into a ground wiring through the resistance element R1, and a current obtained by subtracting a current flowing into the ground wiring through the resistance element R1 from a current flowing into the contact point through the resistance element R2 is used for charging the capacitance element C1. Therefore, the selection signal Select can be generated with a delay of a predetermined time by appropriately setting a capacity value of the capacitance element C1 with respect to the resistance value of each of the resistance elements R1 and R2. Accordingly, similar to that illustrated in FIG. 9, the signal terminals PLPMode and PePPS are in the connected state later than the signal terminals PSCL and PSDA being in the connected state.

The optical transceivers 1A, 1B, 1C, and 1D according to the foregoing embodiment and modification examples may be embodied as optical transceivers in conformity with the SFP-DD MSA. However, they may be in conformity with other standard specifications. For example, they may be in conformity with quad small form-factor pluggable double density (QSFP-DD) MSA. In this case, the signal lines and the signal terminals corresponding to the control signal LPMode and the clock signal ePPS in the foregoing embodiment and modification examples can be replaced by the signal lines and the signal terminals corresponding to a signal VS2 (module vendor specific 2) and a signal VS3 (module vendor specific 3).

What is claimed is:

1. An optical transceiver configured to be inserted into an apparatus in a first direction, the optical transceiver comprising:

an electrical connector having a first row and a second row, the first row and the second row being arranged in the first direction so that the first row is first inserted into the apparatus and the second row is later inserted into the apparatus when the optical transceiver is inserted into the apparatus, the second row including a first signal pad and a second signal pad, the first signal pad and the second signal pad being arranged in a second direction crossing the first direction, the first row including a third signal pad and a fourth signal pad, the third signal pad and the fourth signal pad being arranged in the second direction, the first signal pad and the third signal pad being arranged in the first direction, the second signal pad and the fourth signal pad being arranged in the first direction;

an internal circuit configured to be electrically connected to the apparatus through the electrical connector when the optical transceiver is completely inserted into the apparatus, and generate a switching signal after the first signal pad and the second signal pad are electrically connected to the apparatus;

a first switch configured to isolate the third signal pad from the internal circuit when the third signal pad of the optical transceiver is connected to an electrical connector of the apparatus, and put the third signal pad electrically connectable to the internal circuit in accordance with the switching signal when the optical transceiver is fully inserted in the apparatus; and a second switch configured to isolate the fourth signal pad from the internal circuit when the fourth signal pad of the optical transceiver is connected to an electrical connector of the apparatus, and put the fourth signal pad electrically connectable to the internal circuit in accordance with the switching signal when the optical transceiver is fully inserted in the apparatus.

2. The optical transceiver according to claim 1, wherein the first switch is configured to disconnect the third signal pad from the internal circuit when the electrical connector is not engaged with a receptacle connector of the apparatus, and wherein the second switch is configured to disconnect the fourth signal pad from the internal circuit when the electrical connector is not engaged with the receptacle connector of the apparatus.

3. The optical transceiver according to claim 1, wherein the internal circuit generates the switching signal after the optical transceiver is fully inserted to the apparatus.

4. The optical transceiver according to claim 1, wherein the electrical connector has a top side and a bottom side opposite to the top side in a third direction crossing the first direction and the second direction, wherein the first signal pad and the third signal pad are provided on the top side, wherein the bottom side has a first power pad opposite to the first signal pad and a third power pad opposite to the third signal pad, the third power pad being isolated from the first power pad, wherein the internal circuit includes a switching signal circuit configured to generate the switching signal, and wherein the switching signal circuit is activated by receiving an electrical power from the apparatus thought the first power pad.

5. The optical transceiver according to claim 4, wherein the second signal pad and the fourth signal pad are provided on the top side, wherein the bottom side has a second power pad opposite to the second signal pad and a fourth power pad opposite to the fourth signal pad, the fourth power pad being isolated from the second power pad, wherein the switching signal circuit is activated by further receiving an electrical power from the apparatus thought the second power pad.

6. The optical transceiver according to claim 1, further comprising a switching signal circuit configured to be operational by receiving an electrical power from the apparatus through the electrical connector and generate the switching signal after the electrical connector is engaged with a receptacle connector of the apparatus.

* * * * *